DEFENSIVE PUBLICATION

UNITED STATES PATENT AND TRADEMARK OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent and Trademark Office makes no assertion as to the novelty of the disclosed subject matter.

PUBLISHED JULY 6, 1976

948 O.G. 6

T948,008

POLYMER COMPOSITIONS

Terence Edwin Attwood, Kimpton, and John Leslie Freeman and Leslie Richard John Hoy, St. Neots, England, assignors to Imperial Chemical Industries Limited, London, England Claims priority, application Great Britain, Mar. 14, 1974, 11,439/74, 11,440/74
Filed Feb. 25, 1975, Ser. No. 553,069
Int. Cl. I08k *1/01*
U.S. Cl. 260—45.7 P
No Drawing. 17 Pages of Specification Aromatic polyetherketones are characterized by their high softening point and high melt viscosities, thus making them useful where the resulting article must withstand high service temperatures.

Novel thermoplastic compositions comprising an aromatic polyetherketone are modified with organic phosphorous compounds to at least stabilize, and in some instances reduce, the melt viscosity of the composition thereby rendering the polyetherketone compositions easier to melt-fabricate.

For example, compositions comprising an aromatic polyetherketone, such as containing the repeating units:

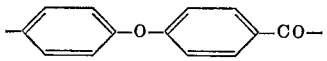

in which some (i.e. up to 25%) of the —CO— groups may be replaced by —$SO_2$— groups, and 0.01 to 4% (preferably from 0.01% to 2%) of at least one phosphorus additive compound of formula:

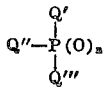

where each of Q′, Q″ and Q‴ if R or OR where R is a hydrocarbon radical consisting up to 20 carbon atoms $n$ is 0 or 1 are disclosed.

A specific example is the polymer consisting of repeating units of:

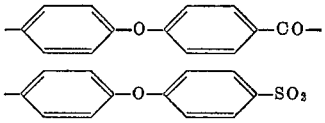

and in the ratio of 95:5 to which is added 0.2% tri (nonyl phenyl) phosphite.

Incorporation of the phosphorus compound, as indicated, reduces the tendency of the melt viscosity of the polyketone to increase upon prolonged heating and hence stabilizes the polyketone. Other polymers that may be used are:

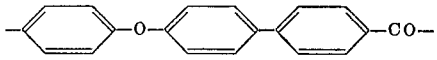

alone or copolymerized with:

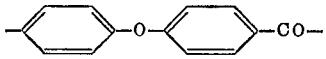

Triphenyl phosphate is a preferred phosphorous compound.